Sept. 7, 1937.  E. C. EBERTS  2,092,729
METHOD OF PRODUCING TOMATO JUICE BEVERAGE
Filed Oct. 15, 1934
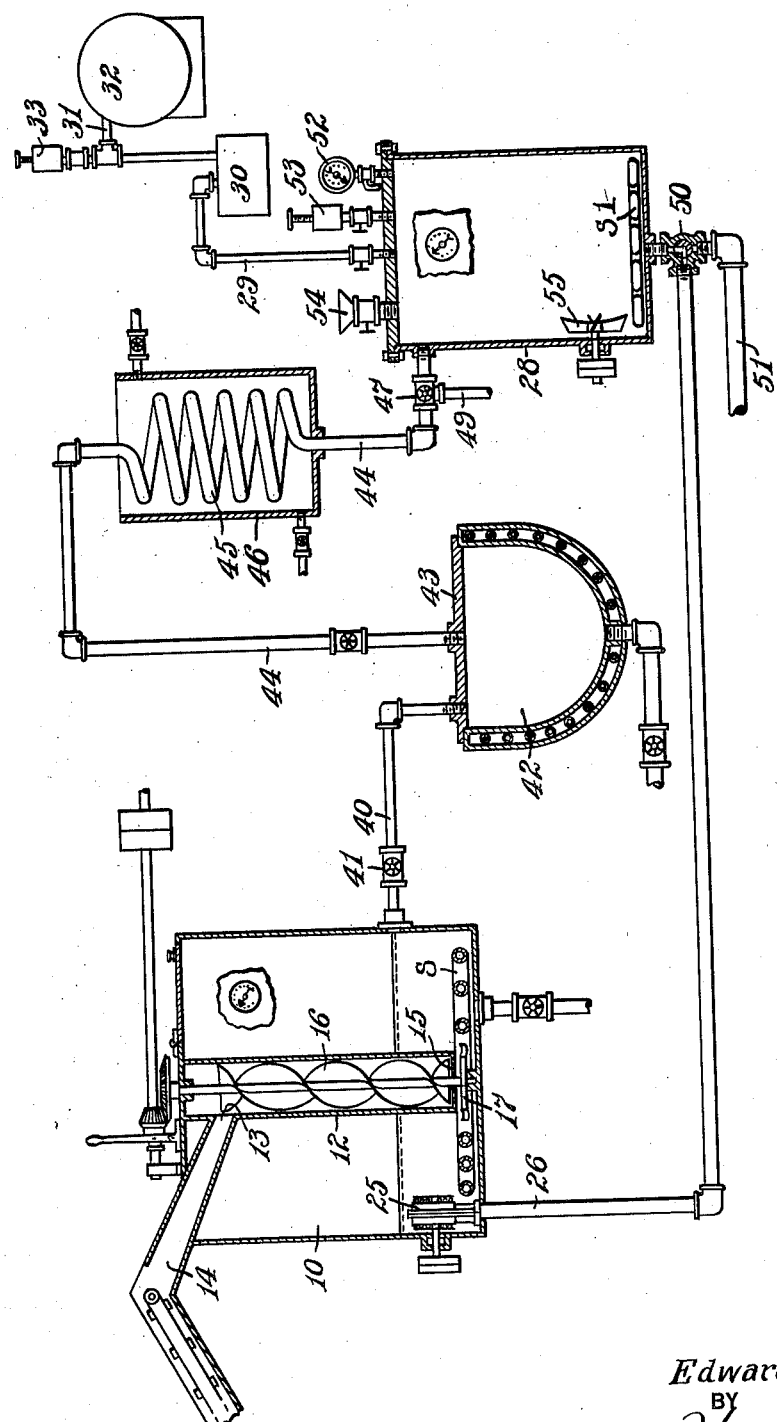
INVENTOR
Edward C. Eberts,
BY
Hood & Hahn.
ATTORNEYS Patented Sept. 7, 1937

2,092,729

UNITED STATES PATENT OFFICE 2,092,729

METHOD OF PRODUCING TOMATO JUICE BEVERAGE

Edward C. Eberts, Indianapolis, Ind., assignor to Stokely Brothers & Company, Indianapolis, Ind., a corporation of Delaware Application October 15, 1934, Serial No. 748,331

1 Claim. (Cl. 99—105)

Tomato juice intended to be packaged for interstate commerce must, of course, comply with government regulations that it shall be an "unconcentrated pasteurized product consisting of a liquid with a substantial portion of the pulp, expressed from ripe tomatoes". A product answering to the above definition is not necessarily either stable or as finely flavored as it may be.

It is well-known that juices of fresh tomatoes contain vitamines A, B and C and that, when such juices are produced by substantial crushing of the fruit by the usual methods in order to obtain a juice having a commercially acceptable solid content, there is a rapid flavor deterioration and loss of vitamin content, particularly vitamin C, before the juice can be commercially packaged and that, in many instances, the solid content of the extracted juice has a tendency to separate from the liquid.

When tomatoes are crushed the cells, within which the enzymes are naturally sealed, are broken and freshly liberated enzymes, in the presence of oxygen, apparently very actively and quickly cause or stimulate a change of pectin to pectic acid and, as a result, a substantial vitamin content appears to be destroyed. Apparently, also, the development of pectic acid substantially diminishes the ability of the solid content to remain suspended uniformly in the liquid body.

In the commercial production of tomato juice there remains a considerable volume of tomato solids which must be utilized in other tomato products if the production of juice is to be profitable.

Tomatoes grown in some localities under the normal climatic conditions, and those grown in other localities under abnormally dry conditions, are so lacking in liquid content that difficulty has heretofore been found in lawfully producing therefrom a satisfactory and commercially acceptable tomato juice in profitable volumes, and my present invention relates to an improved method of treating fresh tomatoes (having the above characteristics) to profitably produce therefrom a lawful and satisfactory tomato juice beverage and a residue of tomato pulp usable in the production of other tomato food products.

Briefly stated my present invention, in its most acceptable form, involves the following steps:— the establishment and maintenance at superatmospheric temperatures of a dominant pool of fresh tomato pulp and tomato juices; the prompt submergence of fresh tomatoes in said pool and the crushing of those tomatoes while submerged; the withdrawal, from a submerged region of the pool, of juices and entrapped fine pulp; the withdrawal, from upper regions of the pool, of pulp and entrapped juices; the further heat treatment of the last-mentioned pulp and entrapped juices to vaporize portions thereof; the condensation of the vapors emanating from said last-mentioned pulp and entrapped juices resulting from such heat treatment; and the condensation of said vapors and admixture of said condensate with the first-mentioned extracted juices and entrapped pulp.

The accompanying drawing illustrates diagrammatically apparatus by means of which my improved method may be commercially practiced. In the drawing 10 is the main cooking vat within which a dominant tomato pool is to be maintained, said vat being provided with a suitable heating coil S. Projected downwardly into said vat is tube 12 of considerably smaller diameter than the vat but of an internal diameter somewhat in excess of the largest tomato diameter. The upper part of this tube leads from a point above the maximum level of the tomato pool to a plane near the bottom of the vat. Leading into tube 12, at 13, is a feed spout 14 through which fresh fruit may be delivered. Within tube 12 is a screw flight conveyor 16 the upper end of which is above the maximum level of the dominant pool and the lower end of which is adjacent a perforated plate 15 obstructing the lower end of tube 12. Below the plate 15 and carried by the shaft of the screw conveyor 16 is an agitator 17.

Arranged in the lower zone of tank 10 is a juice separator 25 the interior of which delivers to a pipe 26 which leads into the bottom of a tank 28 which may be rendered air tight. Leading from the upper regions of tank 28 is a suction pipe 29 which leads through a trap 30 and pipe 31 to an exhauster 32. Associated with pipe 31 is an automatic control valve 33 which will serve to automatically limit the degree of minus pressure which exhauster 32 may establish within the upper regions of tank 28.

Leading from tank 10 preferably at a level above the level of separator 25 is a pipe 40 which leads through valve 41 into a cooker 42. This cooker may be rendered air-tight by cover 43 and leading from the upper regions of the cooker is a conduit 44 which comprises the condenser coil 45 of the condenser 46.

Pipe 44 leads, through a suitable valve 47, into tank 28, a bypass 49 leading from pipe 44, conveniently through valve 47 to permit discharge of any surplus of condensate.

Tank 28 is provided with a suitable heating coil S¹ and this tank may be discharged through valve 50 and pipe 51 to suitable packaging machinery.

Tank 28 should preferably be provided with a pressure gage 52, an automatic pressure-controlling valve 53 by means of which the amount of minus pressure may be limited, and a condiment valve 54 by means of which desired condiments may be inducted into the tank 28. In the lower regions of tank 28 is preferably a mechanical stirring mechanism 55 by means of which the contents of the tank 28 may be stirred.

The operation is as follows:

A dominant pool of juices and pulp of tomatoes is first established in tank 10 and brought to and maintained at sterilizing temperature, say about 180 to 190 degrees F., sufficient to discourage enzyme reactions. Fresh tomatoes delivered through chute 13 will be forced downwardly by conveyor 16 so as to be promptly submerged in the dominant pool, heated thereby and carried to and expressed through the perforated plate 15. A desired quantity of liquid and entrapped fine pulp will pass through the separator 25 into tank 28, this movement being assisted by reason of a minus pressure maintained within tank 28 and occurring without such splashing as would facilitate oxidation.

When the tomatoes being treated are lacking in liquid content, as for instance such tomatoes as are normally produced in California, the extract which passes through the separator 25 is much too thick to be satisfactory as a beverage.

The pulp and entrapped juice extracted from a zone of tank 10 above the zone of separator 25 may pass through pipe 40 into kettle 42 where it is subjected to additional heat treatment necessary to prepare it for use in other tomato products such as catsup, chili sauce, etc. The vapors arising from the tomato mass as a result of this heat treatment pass through pipe 44 and condensing coil 45 so that the condensate may be delivered to the contents of tank 28 and be mixed therewith, thereby supplying a sufficient amount of liquid, obtained from the tomatoes, to produce an acceptable tomato juice beverage of proper liquid content, the desired liquidity being obtained without dilution so far as tomato content is concerned.

It will, of course, be understood that the vapors arising from kettle 42 will contain tomato volatiles other than water and that these volatiles will condense and form part of the condensate which is delivered to the extract obtained through the juice separator 25.

Heretofore the heat treatment of masses of tomato pulp and entrapped juices as a step in the production of tomato products of low liquid content has ignored and wasted the vapors produced during this heating step.

Tomato juice beverage has heretofore been produced from California-grown tomatoes but, because of the low water content of these tomatoes great difficulty has been experienced in lawfully obtaining a tomato juice beverage of acceptable vitamin and liquid content and it has been found necessary to perform the necessary crushing operations while the fruit is cold in order to obtain sufficient liquid. When tomato juices are produced in that way it has been found that there is a very decided vitamin loss. On the other hand, while attempts have been made to produce a tomato juice beverage by a hot process there has apparently been a reaction between the water content and the pectin content which has resulted in a tomato juice beverage having less fluidity than when fruit of the same character is subjected to a cold process, although, under proper conditions, the tomato juice produced by the hot process will have a vitamin content better than that of the cold process juice.

I have found that by following the method which I have outlined above wherein fruit of low water content is promptly submerged in a hot dominant pool and then reduced to pulp and juice and wherein the extracted juice with entrapped pulp is supplemented by the condensate available from the additionally heat-treated pulp and entrapped juice, I am able to produce a tomato juice beverage of satisfactory fluidity having adequate vitamin content.

I claim as my invention:

The method of producing tomato juice beverage from fresh tomatoes which comprises the following steps:—the establishment of a dominant pool of tomato juice and pulp and the maintenance thereof at a sterilizing temperature; the prompt submergence of fresh tomatoes in said dominant pool and the subsequent reduction of the tomatoes while submerged to pulp and juice; the extraction from a submerged zone of the pool of juice and entrapped fine pulp; the extraction from the pool of pulp and entrapped juice; the heat treatment of said extracted pulp and entrapped juice to reduce the water content thereof by vaporization; and the condensation of said vapors and admixture of the condensate with the extracted juice and entrapped pulp.

EDWARD C. EBERTS.